United States Patent [19]

Murphy

[11] Patent Number: 5,101,465
[45] Date of Patent: Mar. 31, 1992

[54] LEADFRAME-BASED OPTICAL ASSEMBLY

[75] Inventor: Edmond J. Murphy, Bethlehem, Pa.

[73] Assignee: AT&T Bell Laboratories, Murray Hill, N.J.

[21] Appl. No.: 563,455

[22] Filed: Aug. 7, 1990

[51] Int. Cl.⁵ .................................. G02B 6/32
[52] U.S. Cl. ............................. 385/88; 357/19
[58] Field of Search .............. 350/96.20, 96.15, 96.17; 357/19

[56] References Cited

U.S. PATENT DOCUMENTS

| | | | |
|---|---|---|---|
| 3,764,862 | 10/1973 | Jankowski | 317/234 R |
| 3,820,237 | 6/1974 | Effer | 29/588 |
| 3,914,786 | 10/1975 | Grossi | 357/68 |
| 4,129,682 | 12/1978 | Stewart et al. | 428/571 |
| 4,296,998 | 10/1981 | Dufft | 350/96.2 |
| 4,322,628 | 3/1982 | Tanaka | 357/19 X |
| 4,794,431 | 12/1988 | Park | 357/19 |
| 4,933,729 | 6/1990 | Soejima et al. | 357/19 |
| 4,980,568 | 12/1990 | Merrick et al. | 357/19 X |
| 4,995,049 | 2/1991 | Kahen et al. | 357/19 X |

Primary Examiner—Frank Gonzalez
Assistant Examiner—Phan T. Heartney
Attorney, Agent, or Firm—Wendy W. Koba

[57] ABSTRACT

A leadframe-based optical assembly is disclosed which is suitable for use with either transmitter or receiver optical assemblies. The leadframe includes a number of separate sections, each leadframe section being associated with a separate optical assembly. A particular leadframe section includes a first contact lead with an aperture therethrough such that the active region of the optical may be aligned with the aperture. A first electrical connection is made between the first lead and the optical device surface containing the active region. The remaining electrical connection is provided by a second contact lead which is wire bonded to the opposing surface of the optical device. A fiber section (fiber-containing ferrule) is attached to the opposite side of the leadframe in the vicinity of the first contact aperture to provide coupling between the optical fiber and the active region. Lensed fibers and/or semiconductor optical devices may be used to increase coupling efficiency.

47 Claims, 3 Drawing Sheets

10

12

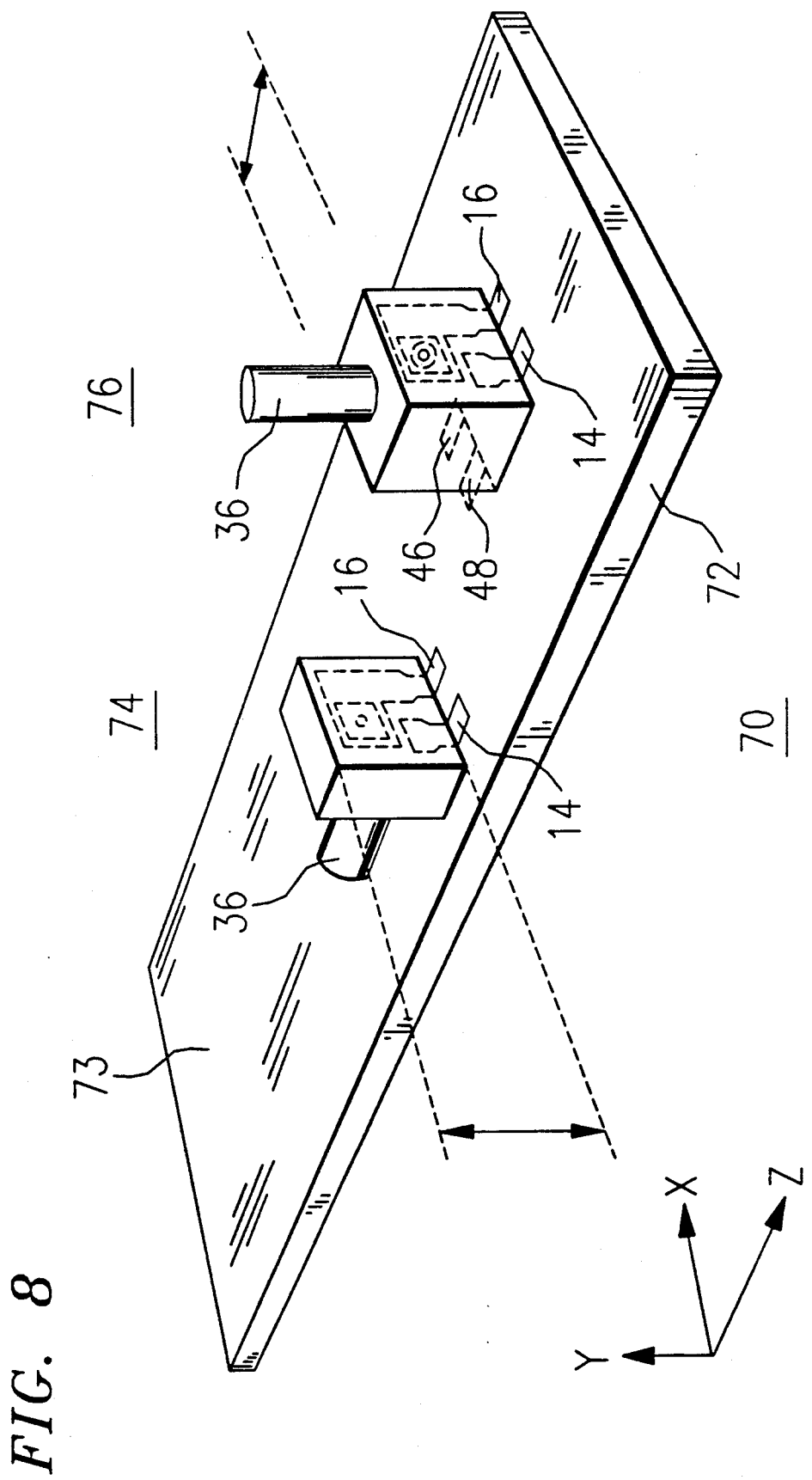

LEADFRAME-BASED OPTICAL ASSEMBLY

BACKGROUND OF THE INVENTION

1. Field of the Invention

The present invention relates to an optical assembly and, more particularly, to a leadframe-based optical assembly.

2. Description of the Prior Art

When packaged for use as indicator devices, visible light-emitting diodes (LEDs), such as GaP or GaAsP LEDs, are often attached to a leadframe to provide the required electrical connections, and encapsulated in a plastic or other transparent material to provide mechanical protection. See, for example, U.S. Pat. No. 4,129,682 issued to W. P. Stewart et al. on Dec. 12, 1978. Since a visible LED is used primarily as an indicator bulb (in key telephone sets, for example) the direct attachment thereto of an optical signal path, such as an optical fiber or waveguide, is not required.

Alternatively, for optical communication applications, a semiconductor optical device (i.e., LED or photodiode) must be both electrically connected to an associated transmitter or receiver circuit and optically coupled to an associated optical data signal path. The packaged optical assembly generally comprises a separate optical submount for holding the optical device and some sort of arrangement for inserting an optical fiber through the package and aligning the fiber to the optical device. In general, the electrical leads to the optical device are physically attached to the optical submount and exit through the package to associated external circuitry. See, for example, U.S. Pat. No. 4,296,998 issued to W. H. Dufft on Oct. 27, 1981.

The optical assembly, as described above, is often a relatively expensive item, since each assembly must be individually packaged. In most cases, the packing requires a number of individual manual operations including, but not limited to, mounting the optical device, attaching the electrical leads to the optical device, inserting the optical fiber, aligning the optical fiber to the device and attaching the aligned fiber to the package. The use of such a large number of manual operations necessitates that the package dimensions be sufficiently large to allow for manipulation of the various piece parts by the assembler.

In light of the above, there exists a need for reducing the cost, size and complexity of such packaged optical assemblies.

SUMMARY OF THE INVENTION

The need remaining in the prior art is addressed by the present invention which relates to an optical assembly and, more particularly, to a leadframe-based optical assembly.

In one embodiment of the present invention, an optical device is attached to a leadframe section (many devices being simultaneously attached along the length of the complete leadframe) such that the active region of the device is aligned with an aperture formed in one contact lead of the leadframe section. A fiber section, such as a fiber-holding ferrule, is attached to the opposite side of the leadframe section in the vicinity of the aperture and aligned to the active region of the associated optical device. An exemplary ferrule may include a flanged end portion to facilitate attachment of the fiber section to the leadframe. Each optical device, associated leadframe section and ferrule may then be encapsulated (with a portion of the ferrule and the electrical leads extending beyond the encapsulant) to form the final optical assembly. The semiconductor optical device may comprise, for example, a surface-emitting LED (to form a transmitter assembly), or a PIN or avalanche photodiode (to form a receiver assembly).

Thermal dissipation may be provided in accordance with an additional aspect of the present invention, where the leadframe section is designed to incorporate a separate thermal dissipation feature for transporting heat away from the optical device. The feature may be attached to the optical device by a thermally conductive adhesive.

Improved coupling efficiency, less restrictive alignment tolerances, and flexibility in design may be achieved in association with the various embodiments of the present invention by the utilization of a lensed optical device, lensed optical fiber, a separate lens element or any combination thereof.

An additional advantage of the leadframe-based design of the present invention is that the package may be formed to include relatively thin, flexible leads to accommodate variations in both the angle and position of the incoming fiber attachment. In accordance with one embodiment of the present invention, flexibility is achieved by tapering the width of the leads.

Other and further advantages of the present invention will become apparent during the course of the following discussion and by reference to the accompanying drawings.

BRIEF DESCRIPTION OF THE DRAWING

Referring now to the drawings, where like numerals represent like parts in several views:

FIG. 8 illustrates various optical assemblies formed in accordance with the present invention, attached by the exposed electrical leads to an associated printed circuit board.

DETAILED DESCRIPTION

Figure 1:
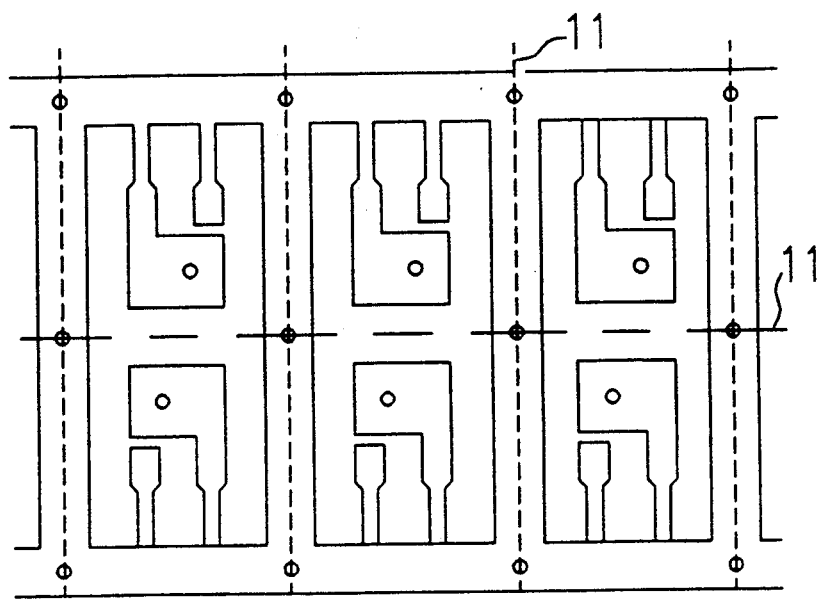
FIG. 1 illustrates an exemplary leadframe which may be used in assembling the optical assembly of the present invention.

Referring to FIG. 1, an exemplary leadframe 10 is illustrated which includes a large number of severable leadframe sections for use with a number of separate optical assemblies. It is an advantage of the present invention that the use of leadframe 10 allows for batch processing of optical assemblies such as transmitters (LED-based) or receivers (photodiode-based). Similar to integrated circuit processing, a plurality of optical devices and optical fiber sections may be attached to a single leadframe 10 so as to allow for batch fabrication. Leadframe 10, may then be severed along dotted lines 11 into a plurality of leadframe sections, each section associated with a separate optical assembly. The remaining figures illustrate a single leadframe section and the attachments thereto. It is to be understood that the illustration of a single leadframe section is only for the sake of discussion and in general a larger number of optical assemblies may simultaneously be formed.

Figure 2:
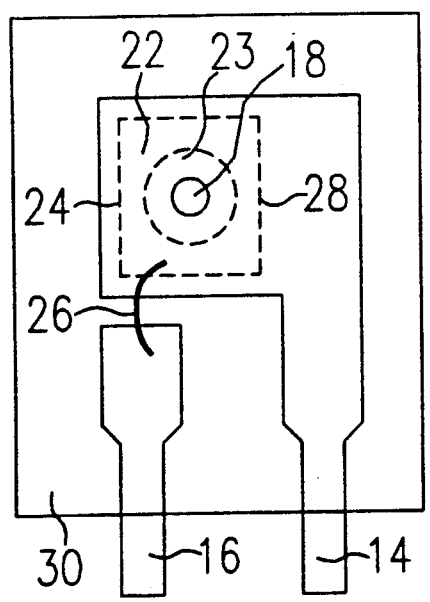
FIG. 2 illustrates an exemplary single leadframe section and associated optical device.

A single leadframe section 12 is particularly illustrated in FIG. 2. Section 12 includes a first contact lead 14 and a second contact lead 16. First lead 14 includes an aperture 18. An optical device 22 (i.e., g surface-emitting LED or PIN photodiode), illustrated in phantom in FIG. 2, is attached to first lead 14 such that active region 23 of device 22 is positioned over aperture 18. Aperture 18 is formed to be sufficiently large so that substantial alignment thereto of active region 23 is relatively straightforward. Aperture 18 is limited in the extreme by the requirement for sufficient electrical contact between first lead 14 and bottom surface 24 (shown in FIG. 3) of device 22. Second contact lead 16 is disposed as shown in FIG. 2 so as to be electrically isolated from first contact lead 14. The remaining electrical contact to device 22 is provided by wire bond(s) 26 between top surface 28 and second lead 16. The arrangement of FIG. 2 may then be encased within an encapsulant 30 (for example, a plastic material) to form the final packaged optical assembly. As indicated, end portions of leads 14,16 must extend beyond the outer boundary of encapsulant 30 to provide the electrical connections between the optical assembly and the associated electronic circuitry (not shown).

Figure 3:
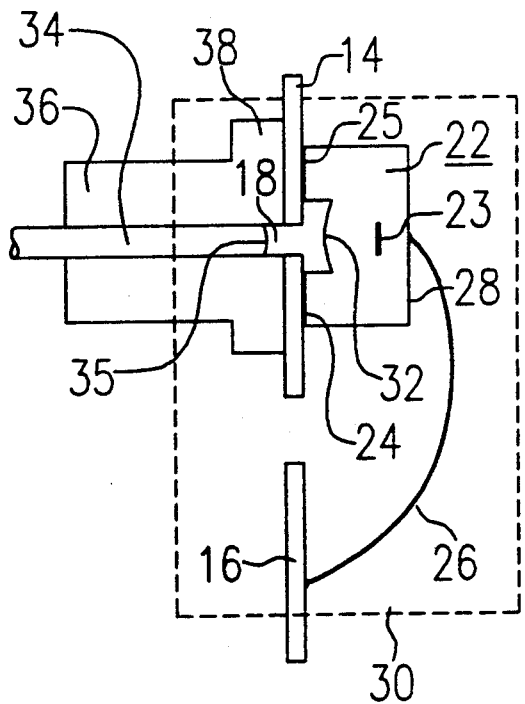
FIG. 3 is a side view of an exemplary leadframe section, illustrating in particular a lensed surface-emitting LED and lensed fiber attachment.

FIG. 3 illustrates, in a cut-away side view, an exemplary leadframe arrangement, including an attached optical fiber segment. As shown, optical device 22 is positioned with its active region 23 aligned to aperture 18 of leadframe 14, as discussed above. A bonding material 25, such as gold/tin, gold/germanium, indium, or lead/tin solder (or a conductive adhesive), is used to electrically connect bottom surface 24 of device 22 to first contact lead 14. In this particular embodiment, optical device 22 includes a lensed surface 32 to increase the coupling efficiency between the optical fiber and the device. The fiber attachment comprises a fiber section 34 encased within a fiber ferrule 36. It is to be understood that either multimode or single mode fiber may be used in the formation of fiber section 34. Ferrule 36 may include a flanged end portion 38 to facilitate attachment to leadframe 14. Such a flanged arrangement, however, is merely an alternative and various other fiber ferrule designs may be utilized. For the particular arrangement as illustrated in FIG. 3, end region 35 of fiber 34 is lensed to further improve the coupling (and the alignment tolerances) between fiber 34 and device 22. Encapsulant 30, illustrated in phantom in this view, is shown as encasing a portion of fiber ferrule 36 as well as leadframe section 12 and optical device 22. It is to be understood that such an encapsulant may be formed so as to encompass only the leadframe and optical device, leaving the fiber ferrule portion fully exposed. Additionally, it is to be understood that the assembly sequence used to form the inventive leadframe-based assembly is discretionary in that either the semiconductor optical device or fiber section may be first attached to the leadframe. Indeed, the assembly process may be simplified if the fiber (having a relatively large core region with respect to the frame aperture) is attached first, since active alignment means may then be used to position the semiconductor optical device and provide maximum coupling efficiency therebetween. Alternatively, a fiber which comprises a smaller outer diameter than the aperture may be positioned within the aperture such that its endface is approximately flush with the surface of contact 14. Visual coupling means can then be used to position the semiconductor optical device and provide coupling therebetween.

Figure 4:
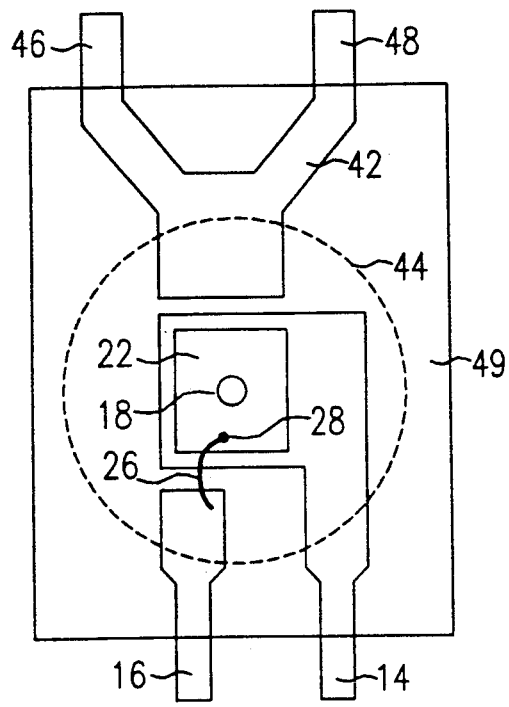
FIG. 4 illustrates an alternative leadframe arrangement including a thermal dissipation feature.

An alternative leadframe section 40, including an additional feature 42 for providing improved thermal dissipation is illustrated in FIG. 4. Similar to the arrangement of FIG. 2, leadframe section 40 includes first lead 14, with an aperture 18, for attachment thereto of an optical device 22. Second lead 16 is then attached via wirebond 26 to top surface 28 of device 22. Thermal dissipation feature 42 is located in relatively close proximity to optical device 22, remaining electrically isolated form both leads 14 and 16. A thermally conductive (and electrically insulative) material 44 is then used to attach device 22 to feature 42. The external lead portions 46,48 of feature 42 may then be connected to a conventional heat sink surface (not shown) on the integrated circuit board (or package wall) to which the final optical assembly is attached. The final structure, as shown in FIG. 4 may then be covered with an encapsulant 49. Alternatively, thermally conductive material 44 may be utilized as the final encapsulant for the structure.

Figure 5:
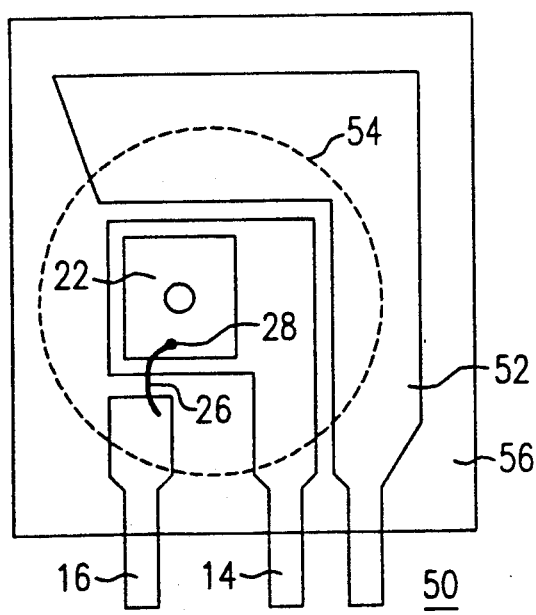
FIG. 5 illustrates yet another leadframe arrangement including an alternative thermal dissipation feature.

In the particular embodiment illustrated in FIG. 4, leads 46,48 are disposed on the opposite side of leadframe section 12 from electrical leads 14,16. For some applications, it may be desirous to have all leads positioned on the same side of the package. FIG. 5 illustrates an alternative leadframe 50 with a thermal dissipation feature 52 designed so as to exit the final package on the same side as electrical leads 14,16. As shown, thermal dissipation feature 52 is located in close proximity to optical device 22 and attached thereto using a thermally conductive (electrically nonconductive) epoxy 54, such as that described above in association with FIG. 4. Feature 52 may be used, alternatively, as a ground plane to provide EMI shielding for the optical device.

Figure 6:
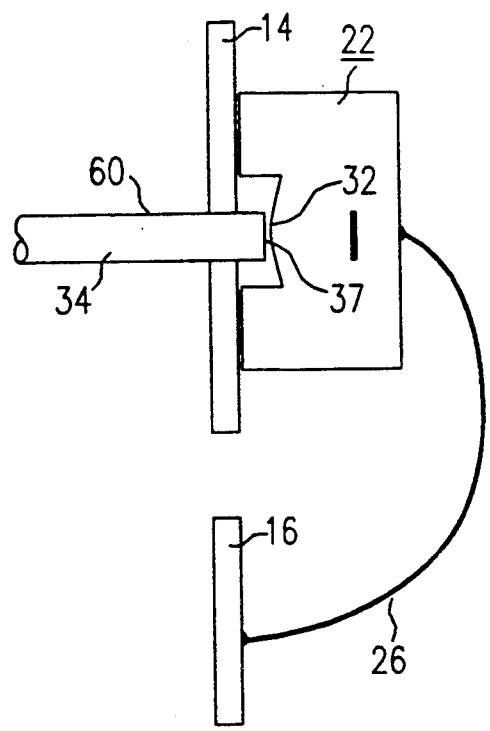
FIG. 6 illustrates an alternative leadframe-base assembly wherein an optical fiber, instead of a fiber ferrule, is directly attached to the leadframe.

An alternative leadframe-based assembly of the present invention is illustrated in FIG. 6. In this embodiment, a fiber 34 is directly attached to first lead 14, without the use of a surrounding ferrule. As shown in FIG. 6, endface 37 of fiber 34 may protrude through aperture 18 and may even be brought into physical contact with device 22 (as long as damage is avoided). In this example, with the lensed surface 32 of device 22. In order to facilitate the attachment of fiber 34 to first contact lead 14, fiber 34 may include an outer coating 60 of a suitable material, such as a metal or polyimide material.

Figure 7:
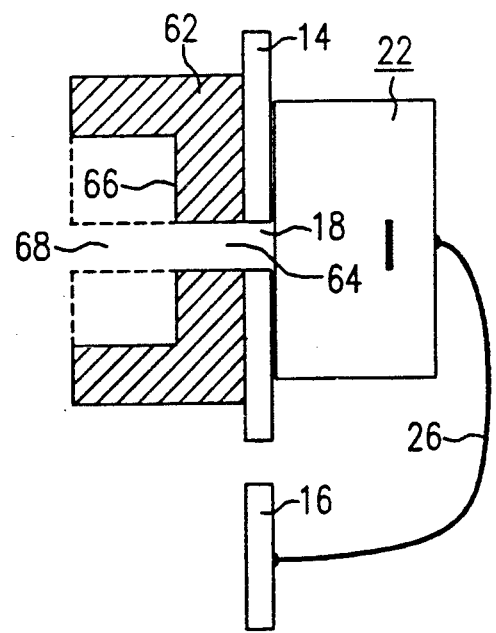
FIG. 7 illustrates yet another leadframe-based optical assembly including a fiber receptacle directly mounted on the leadframe.

FIG. 7 illustrates yet another embodiment of the present invention where a fiber receptacle 62 is attached as shown to first contact lead 14. Receptacle may be of a plastic, metallic, or other suitable material. As shown in FIG. 7, receptacle 62 includes an opening 64 which is substantially aligned with aperture 18 of first contact lead 14. Receptacle 62 may include a recessed portion 66 to allow for attachment thereto of a ferrule, such as ferrule 36 of FIG. 3. Alternatively, receptacle 62 may be formed to include a central bore 68 (as shown in phantom in FIG. 7) to allow for direct placement of an optical fiber. Advantageously, the use of receptacle 62 provides for simplified mechanical alignment of the included optical fiber to the active region of the associated optical device.

FIG. 8 illustrates an exemplary system 70 utilizing leadframe-based optical assemblies of the present invention. As shown, system 70 includes a printed circuit board 72 with a plurality of different leadframe-based optical assemblies attached thereto. In some instances, it may be desirous to allow the attached optical assembly a degree of motion (e.g., 1–10 mil) with respect to printed circuit board 72. That is, to allow the assembly to "float" with respect to the plane established by top surface 73 of printed circuit board 72. The motion of the optical assembly may then be used to accommodate for variations in the angle and position of the incoming fiber attachment (not shown). Accordingly, a first leadframe-based assembly 74 (similar in design to that illustrated in FIG. 2), may be formed utilizing relatively thin and flexible leads 14,16, with leads 14,16 being attached to top surface 73 of printed circuit board 72. As shown in FIG. 2, leads 14,16 may be designed to incorporate such flexibility by forming tapered leads. In particular, the leads may be tapered from a width of approximately 20 mil at the site of the optical device attachment to a width of approximately 10 mil at the attachement to printed circuit board 72. The thickness of the leads may also be tapered. In general, the leads are tapered to provide the desired flexibility without sacrificing the integrity of the electrical attachment to printed circuit board 72. Thus, fiber ferrule 36 of optical assembly 74, illustrated as being disposed along the z-direction of printed circuit board 72, will be able to accommodate motions, as indicated by the arrows in FIG. 8, to facilitate the attachment of a communication optical fiber (not shown). A second leadframe-based assembly 76, similar in design to that illustrated in FIG. 4, is also illustrated in FIG. 8. In this case, assembly 76 is mounted to provide attachment for leads 14,16 as well as thermal dissipation leads 46,48. In this particular arrangement, fiber ferrule 36 is illustrating as exiting circuit board 64 in the y-direction such that a communication fiber may then be attached thereto. Again, the utilization of flexibility leads provides for some degree of motion of ferrule 36, as illustrated in FIG. 8. For most applications, it may be desired for the fibers to exit the circuit board in the same direction. The various options are being illustrated here solely for the sake of discussion.

I claim:

1. An optical assembly comprising
an optical device including an active region; and
a leadframe section including:
a first contact with an aperture therethrough, said optical device attached to said first contact so as to form a first electrical connection such that the active region is substantially aligned with the first contact aperture,
a second contact, electrically isolated from said first contact, said optical device electrically coupled to said second contact so as to form a second electrical connection therewith; and
an optical fiber section attached to the leadframe section in proximity to said aperture such that said fiber section is coupled through said aperture to said active region of said optical device.

2. An optical assembly as defined in claim 1 wherein the subassembly further comprises an encapsulant.

3. An optical assembly as defined in claim 2 wherein the encapsulant is disposed to surround the optical device.

4. An optical assembly as defined in claim 2 wherein the encapsulant is disposed to surround the assembly such that end portions of the first and second contacts and the optical fiber section remain exposed.

5. An optical assembly as defined in claim 2 wherein the encapsulant comprises a plastic material.

6. An optical assembly as defined in claims 1 or 2 wherein the optical device comprises an optical transmitting device.

7. An optical assembly as defined in claim 5 wherein the optical transmitting device comprises a surface-emitting LED.

8. An optical assembly as defined in claims 1 or 2 wherein the optical device comprises an optical receiving device.

9. An optical assembly as defined in claim 8 wherein the optical receiving device comprises a PIN photodiode.

10. An optical assembly as defined in claim 8 wherein the optical receiving device comprises an avalanche photodiode.

11. An optical assembly as defined in claims 1 or 2 wherein the optical device comprises a lensed optical device.

12. An optical assembly as defined in claims 1 or 2 wherein the optical fiber section comprises a lensed optical fiber section.

13. An optical assembly as defined in claims 1 or 2 wherein the optical device comprises a lensed optical device and the optical fiber section comprises a lensed optical fiber section.

14. An optical assembly as defined in claims 1 or 2 wherein the leadframe section further comprises thermal dissipation means coupled to the optical device.

15. An optical assembly as defined in claim 14 wherein the thermal dissipation means comprises a third contact electrically isolated from the first and second contacts and attached to the optical device using a thermally conductive, electrically nonconductive material.

16. An optical assembly as defined in claim 15 wherein the first and second contacts are disposed a different side of the leadframe section than the third contact.

17. An optical assembly as defined in claim 15 wherein the first, second and third contacts are positioned on the same side of the leadframe section.

18. An optical assembly as defined in claims 1 or 2 wherein the first and second contacts of the leadframe section are relatively thin and flexible.

19. An optical assembly as defined in claim 18 wherein the first and second contacts are tapered to provide flexibility.

20. An optical assembly as defined in claims 1 or 2 wherein the optical fiber section comprises an optical fiber housed within an optical fiber ferrule.

21. An optical assembly as defined in claim 20 wherein the ferrule includes a flanged end portion which is attached to the leadframe section.

22. An optical assembly as defined in claims 1 or 2 wherein the optical fiber section comprises an optical fiber with an outer coating suitable for attachment to the leadframe section.

23. An optical assembly as defined in claim 22 wherein the fiber outer coating is metallic.

24. An optical assembly as defined in claim 22 wherein the fiber outer coating is a polyimide material.

25. An optical assembly as defined in claims 1 or 2 wherein the optical fiber section comprises
   fiber receptacle means attached to the leadframe section, said fiber receptacle means including a central opening aligned with the leadframe aperture; and
   optical fiber means disposed within said fiber receptacle.

26. An optical assembly as defined in claim 25 wherein the optical fiber means comprises an optical fiber housed within an optical fiber ferrule.

27. An optical assembly as defined in claim 25 wherein the optical fiber means comprises an optical fiber.

28. An optical transmitter assembly comprising
   an LED including an active region; and
   a leadframe section including:
      a first contact with an aperture therethrough, the LED being attached to the first contact such that the LED active region is substantially aligned with the first contact aperture, a first electrical connection being formed between the LED and the first contact;
      a second contact electrically isolated from the first contact and connected to the LED so as to form a second, remaining electrical contact therewith; and
      an optical fiber section attached to the leadframe section in proximity to the first contact aperture such that the fiber section is optically coupled through said aperture to the active region of said LED.

29. An optical transmitter assembly as defined in claim 28 wherein the assembly further comprises an encapsulant.

30. An optical transmitter assembly as defined in claim 29 wherein the encapsulant is disposed to encase the LED.

31. An optical transmitter assembly as defined in claim 29 wherein the encapsulant is disposed to surround the assembly such that end portions of the first and second contacts and the fiber section extend beyond the outer boundary of the encapsulant.

32. An optical transmitter assembly as defined in claims 28 or 29 wherein the LED comprises a lensed LED.

33. An optical transmitter assembly as defined in claims 28 or 29 wherein the fiber section comprises a lensed fiber section.

34. An optical transmitter assembly as defined in claims 28 or 29 wherein the LED comprises a lensed LED and the fiber section comprises a lensed fiber section.

35. An optical transmitter assembly as defined in claims 28 or 29 wherein the leadframe section further comprises thermal dissipation means coupled to the LED.

36. An optical transmitter assembly as defined in claim 35 wherein the thermal dissipation means comprises a third contact electrically isolated from the first and second contacts and attached to the LED with a thermally conductive, electrically nonconductive material.

37. An optical transmitter assembly as defined in claims 28 or 29 wherein the first and second contacts of the leadframe section are relatively thin and flexible.

38. An optical transmitter assembly as defined in claim 37 wherein the first and second contacts are tapered to provide flexibility.

39. An optical receiver assembly comprising
   a semiconductor optical receiving device including an active region; and
   a leadframe section including:
      a first contact with an aperture therethrough, the optical receiving device attached to the first contact so as to form a first electrical connection therewith, the active region being aligned with the first contact aperture,
      a second contact electrically isolated from the first contact, the optical receiving device attached to the second contact so as to form a second, remaining electrical connection therewith; and
      an optical fiber section attached to the leadframe section in proximity to the first contact aperture in a manner such that the optical fiber section is coupled through the aperture to the photosensitive region of the optical receiving device.

40. An optical receiver assembly as defined in claim 39 wherein the assembly further comprises an encapsulant.

41. An optical receiver assembly as defined in claim 40 wherein the encapsulant is disposed to encase the semiconductor optical receiving device.

42. An optical receiver assembly as defined in claim 40 wherein the encapsulant is disposed to surround the assembly such that end portions of the first and second contacts and the fiber section extend beyond the outer boundary of the encapsulant.

43. An optical receiver assembly as defined in claims 39 or 40 wherein the semiconductor optical receiving device comprises a PIN photodiode.

44. An optical receiver assembly as defined in claims 39 or 40 wherein the semiconductor optical receiving device comprises an avalanche photodiode.

45. An optical receiver assembly as defined in claims 39 or 40 wherein the fiber section comprises a lensed fiber section.

46. An optical receiver assembly as defined in claims 39 or 40 wherein the first and second contacts of the leadframe section are relatively thin and flexible.

47. An optical receiver assembly as defined in claim 46 wherein the first and second contacts are tapered to provide flexibility.

* * * * *